Sept. 19, 1939.  T. G. MYERS  2,173,340
FLEXIBLE BELT AND METHOD OF MAKING IT
Filed July 6, 1935   2 Sheets-Sheet 1

THOMAS G. MYERS, INVENTOR
BY John Flam
ATTORNEY

Sept. 19, 1939.         T. G. MYERS                2,173,340
          FLEXIBLE BELT AND METHOD OF MAKING IT
                   Filed July 6, 1935         2 Sheets-Sheet 2

THOMAS G. MYERS  INVENTOR
BY  John Flam
                ATTORNEY

UNITED STATES PATENT OFFICE 2,173,340

FLEXIBLE BELT AND METHOD OF MAKING IT

Thomas G. Myers, Los Angeles, Calif., assignor to U. S. Electrical Motors, Inc., Los Angeles, Calif., a corporation of California Application July 6, 1935, Serial No. 30,109

2 Claims. (Cl. 74—233)

This invention relates to flexible belts used in variable speed transmission devices and power transmission mechanism; and more particularly to belts which may be employed with V belt as well as with flat belt pulleys.

It is one of the objects of this invention to provide a belt which has an increased power transmitting capacity and a long life.

It is another object of this invention to provide a belt which can be operated at a high peripheral speed without failure of the belt.

It is still another object of this invention to provide a belt in which the power dissipated, by the internal and surface friction of the belt, is reduced to a minimum, and very substantially below undesired values.

It is still another object of this invention to provide a belt having opposed inclined pulley engaging side surfaces, having an increased rigidity against lateral compression, and in which the flexibility of the belt in bending around the pulley is increased.

It is still another object of this invention to provide a belt that will have greater frictional torque, and prevent slipping of the belt over the pulley faces.

It is still another object of this invention to provide a belt in which the rigidity of the belt against lateral compression is produced by an inert fluid enclosed within the belt structure.

It is still another object of this invention to provide a flexible belt, which may be employed in variable speed transmissions, in which one of the pulleys is formed by a pair of pulley sections having opposed inclined faces and in which the other pulley may be a flat faced pulley.

It is still another object of this invention to provide a belt and an adjustable pulley structure in which the power loss inherent in such transmission systems is greatly reduced, and in which the belt may be effectively operated with pulley structures in which the pulley diameter has a wide range of adjustment.

A belt of the type employed with pulleys having opposed inclined faces is subject to a combination of many forces. That portion of the belt between the pulley faces is subject to a lateral compression force, parallel to the axis of the pulley. This is caused by the axial force produced by the initial tension in the belt and that due to the useful load transmitted by the belt. The tangential force at the pulley face, which transmits the useful load or power, is transmitted to the driving cords of the belt from these faces by the shearing stress between the driving cords and the material in which they are imbedded. For a fixed set of pulley diameters, the maximum useful tangential force at the pulley face is a direct function of the lateral pressure on the belt. The maximum lateral pressure which the belt can withstand without failure due to fatigue is thus a distinct factor limiting the power transmitting capacity of the belt.

The shearing stress between the driving cords of the belt and the material in which they are imbedded forms another limiting factor for the power transmitting capacity. In order to decrease the lateral pressure per unit area and the shearing stress, it becomes necessary to construct a belt, the cross section area of which is large in proportion to the area of the driving cords of the belt. An additional width of belt, even greater than that required for the limiting shearing stress, is desirable in order to increase the stability of the belt.

An increase in the width of the belt must be accompanied by an increase in the thickness of the belt, otherwise the belt will buckle due to the lateral compression of the pulley faces on the pulley engaging sides of the belt. Thus in order to provide a belt having adequate rigidity against lateral compression it is necessary to provide a belt having a substantial thickness. This is particularly marked in variable speed drives, in which the adjustment of the pulley diameter is directly limited by the width of the belt, and in which a belt of the greatest practical width must be employed to obtain a substantial adjustment of the effective pulley diameter. Thus in order to obtain such a belt of increased width, it is necessary to employ a belt of such thickness and rigidity that it cannot be readily bent around small pulley diameters or operated at high peripheral speeds.

When a belt is bent around a pulley, the external periphery of the belt is stressed in tension and the internal periphery of the belt is stressed in compression. Thus a shearing stress is produced, which tends to separate the top and bottom faces from each other, thereby producing the failure of the belt. Each time that the belt passes over the pulley the belt is bent from a straight line to the curvature of the pulley and then back again to form a straight line. The belt thus passes through a stress cycle each time that it passes over the pulley. Failure from these shearing stresses is a function not only of the total number of reversals of stress but also of the rate at which those reversals take place, as the power dissipated in a belt is a direct function of the rate of stress reversal. For a high rate of heat generation in the belt, the temperature of the interior of the belt is raised to the point where the stress-resisting power of the material is greatly reduced. The peripheral velocity at which the belt may be operated without failure is thus a direct function of the pulley diameter. For, the belt may be caused to fail by operating the belt over a small pulley diameter at a low rate of speed, or the belt may be caused to fail by operating the belt over a large pulley diameter at a high rate of speed.

It is thus obvious that the failure of the belt is accelerated, when it is attempted to increase the rigidity of the belt by increasing the belt thickness.

The present invention obviates these difficulties, common to a belt of large cross section, without any sacrifice of the desirable characteristics.

These results are obtained by providing a belt of tubular form, in which the rigidity of the belt against lateral compression is maintained by means of the fluid pressure exerted by an inert fluid enclosed within the belt structure. The inert fluid effectively maintains the pulley engaging side surfaces of the belt in contact with the pulley faces. However, the flexibility of the belt in bending around the pulleys is greatly increased as the top and bottom faces and side walls of the belt may be made of relatively thin cross section, thus greatly reducing the force required to bend the belt around the pulley and thereby reducing the shearing stress between the tension and compression sections of the belt.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings.

Figure 1:
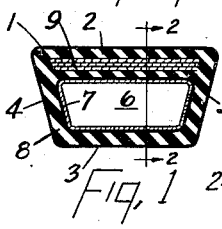
Figure 1 is a sectional view of a belt incorporating the invention, the section being taken in a plane transverse to the length of the belt.

Referring to Figure 1 of the drawings, the belt 1 is formed by the top section 2, the bottom section 3, and the side walls 4 and 5. The top and bottom sections and the side walls of the belt define the fluid cavity 6, formed on the interior of the belt, which may be filled with an inert fluid, such as nitrogen gas, which will not deteriorate the belt material. The fluid within the cavity 6 may be maintained at the pressure required to give the belt adequate rigidity against the lateral compression forces exerted by the pulley faces on the belt. The belt may be formed with a cord section 7 disposed adjacent to the cavity 6, which is covered with the rubber or rubber composition 8 to form the top and bottom sections and side walls of the belt. The top section 2 of the belt carries substantially all of the useful belt tension, and is provided for this purpose with the cord section 9, formed of cord material extending longitudinally of the belt.

The cord section 7 in the interior of the belt is formed of cord material imbedded in the rubber or rubber composition 8, and wound spirally along the length of the belt, in the manner commonly employed in the construction of pneumatic tires. The cord section 7 carries the greatest part of the tension produced in the belt by the fluid pressure of the inert fluid enclosed within the cavity 6.

Figure 3:
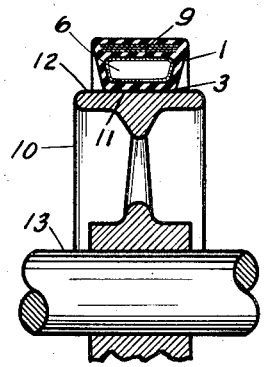
Figure 3 is a diagrammatic sectional view of the belt of Figure 1, shown in conjunction with a flat faced pulley.
Figure 4:
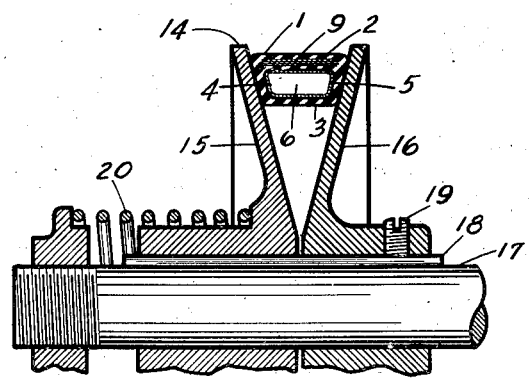
Figure 4 is a diagrammatic sectional view of the belt of Figure 1, shown in conjunction with a variable pulley structure having a pair of pulley sections with opposed inclined faces engaging opposite sides of the belt.
Figure 2:
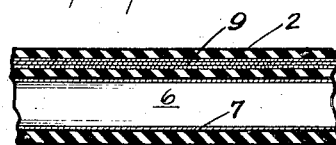
Figure 2 is a fragmentary longitudinal section of the belt of Figure 1, taken along the line 2—2.

Figures 3 and 4 illustrate the use of the belt for power transmission, and particularly in relation to variable speed drives, in which one of the pulley structures may have an adjustable effective diameter, and in which the other pulley structure may be a flat faced pulley. Referring to Figure 3, the power is transmitted between the belt 1 and the fixed diameter pulley 10 by the engagement of inside face 11 of the bottom section of the belt with the crown 12 of the pulley. The pulley 10 may in turn be suitably supported by the shaft 13.

The construction provides an improved traction between the driving belt and the pulley, as substantially all of the useful belt tension is carried by the cord section 9, while the bottom section 3 is yieldingly urged into contact with the pulley crown by the compressed fluid enclosed within the cavity 6. The lower section 3 of the belt thus acts as a wedge between the pulley face and the cord section 9, to give a powerful and positive grip between the belt and the pulley.

Referring to Figure 4, the driving connection between the belt 1 and the adjustable diameter pulley structure 14 is formed by the engagement of the side walls 4 and 5 of the belt with the opposed inclined faces of the pulley sections 15 and 16. The useful belt tension is carried by the cord section 9 and the side walls of the belt are yieldingly urged into contact with the opposed inclined faces of the pulley sections by the inert fluid enclosed within the cavity 6. It is obvious that the belt tension tends to urge the belt radially inward between the opposite pulley faces. However, the fluid pressure within the belt urges the side walls 4 and 5 outwardly to wedge against the pulley faces. The fluid pressure also urges the top section 2 of the belt radially outward to oppose the radial force produced by the belt tension. It is thus obvious that a positive grip is provided between the belt and the pulley sections, while at the same time the rigidity of the belt is maintained against the axial forces produced at the pulley faces and against the radial force produced by the belt tension. However, the flexibility of the belt in bending around the pulley is not impaired, as the side walls 4 and 5, and the bottom section 3 may be formed of relatively thin cross section, thereby permitting the belt to be bent around a small pulley diameter; as the distortion due to the bending of the belt may take place in these parts without producing stresses of appreciable magnitude within the belt structure.

The pulley sections 15 and 16 may be suitably splined to the shaft 17 by means of the key 18. To provide for adjustment of the effective pulley diameter, the pulley section 16 may be suitably secured to the shaft by means of the set screw 19, and the pulley section 15 may be moved axially along the shaft by means of the spring 20. The belt 1 thus urges the pulley sections apart to decrease the effective pulley diameter, and the spring 20 urges the pulley sections together to increase the effective pulley diameter. The position of the belt with respect to the pulley sections may be adjusted by varying the center distance between the driving and driven pulley structures, or by other suitable belt adjusting means.

It is obvious from the disclosures of Figures 3 and 4 that the belt may be employed in a drive, in which one of the pulleys has a flat belt engaging face, and in which the other pulley is a V type pulley. Many such applications arise in which it is desirable to mount a V type pulley of relatively small diameter on a motor shaft to drive a larger diameter flat faced pulley mounted on the driving shaft of a driven machine.

Figure 5:
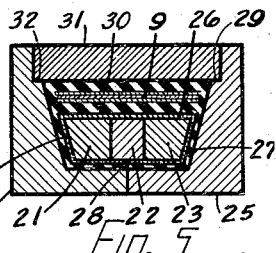
Figure 5 is a sectional view of the mold used in a preliminary step in making the belt of Figure 1.
Figure 6:
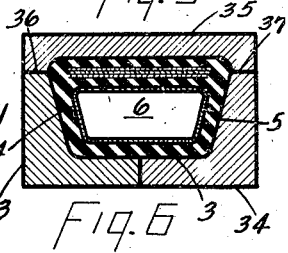
Figure 6 is a sectional view of the final mold used in making the belt of Figure 1.

Figures 5 and 6 illustrate a method whereby the belt 1 may be made in endless form. Referring to Figure 5, the inside of the belt is molded over the annular rings 21, 22 and 23, which may be suitably formed in several segments to provide means for withdrawing the rings from the interior of the molded belt. The ring sections 21, 22 and 23 may be first assembled to form an annular ring, having the same shape as the cavity 6 within the belt. The cord section 7 may then be formed by winding cord material spirally around the annular ring. A relatively thin layer of rubber 27 may then be applied over the cord section 7. The annular ring, with the rubber section 27 applied thereto, may then be placed between the mold sections 24 and 25, which may be suitably urged into contact with each other, to define the interior periphery of the mold. A layer 26 of rubber of suitable thickness may then be applied around the external periphery of the cord section 7. The cord section 9 may then be formed by winding cord material, under suitable tension, over the layer of rubber 26. The cord section 9 may then be covered with a layer 30 of rubber of sufficient thickness to fill the remainder of the mold cavity, after which the mold sections 31 may be suitably pressed inward until they contact the shoulders 32 and 29 formed on the mold sections 24 and 25. The mold section 31 may be formed in as many segments as may be required to suitably compress the molded belt.

After the belt has been molded into the form illustrated by Figure 5, the mold sections 24 and 25 may be withdrawn from each other and the mold section 31 may be removed from the external periphery of the belt. The mold sections 21, 22 and 23, within the belt, may then be removed by cutting the belt along the line 28, in the middle of the interior periphery of the belt.

To build the side walls 4 and 5 and the bottom section 3 of the belt to the required thickness, and to mold the belt into final shape, the belt may be placed within the mold cavity formed by the mold sections 33 and 34, Figure 6, which may be in the form of annular rings. The mold sections 33 and 34 may have layers of rubber of suitable thickness applied thereto, after which they may be placed on either side of the belt and urged together until they come into contact. The top section of the belt is then formed by the mold sections 35, which may be suitably formed in several segments. The mold sections 35 may be suitably urged radially inward until they come into contact with the shoulders 36 and 37 of the rings 33 and 34. Heat may then be applied to cure the rubber. During the curing process, fluid pressure may be applied to the cavity 6 within the belt to urge the top and bottom sections and the side walls of the belt into contact with the walls of the mold cavity. When the rubber has been cured, the belt may be removed from the mold by separating the sections 33 and 34, and by then removing the mold sections 35 from the belt.

Figure 8:
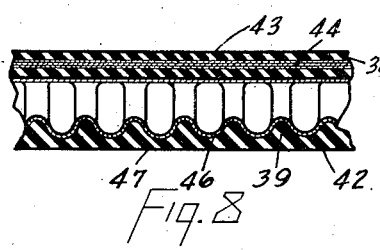
Figure 8 is a fragmentary sectional view, taken longitudinally of the belt of Figure 7 along the line 8—8.
Figure 7:
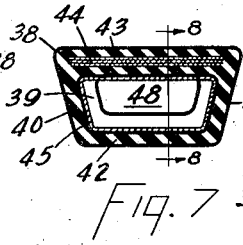
Figure 7 is a sectional view, taken in a plane transverse to the length of the belt, of a modified form of the belt.

Figures 7 and 8 illustrate a form of the belt in which stiffening ribs are provided for increasing the rigidity of the belt against lateral compression. In this form the belt 38 is provided with the stiffening ribs 39, extending along the inside of the side walls 40 and 41 and across the bottom section 42. As in the construction of Figure 1, the belt may be provided with the cord section 45, formed of cord material wound spirally along the length of the belt, and with the cord section 44, formed in the top section 43 of the belt, of cord material extending longitudinally of the belt. As illustrated by Figure 8, the ribs 39 may be distributed at equal intervals along the length of the belt to provide the spaces 46 of decreased wall thickness between the adjacent ribs. Thus, when the belt is bent around the pulley and the inside periphery of the belt is compressed, the greatest distortion will take place in the regions of reduced wall thickness 46, thereby decreasing the resultant stress due to the flexure of the belt.

As in the construction of Figure 1, the cavity 48 within the belt may be filled with an inert fluid at a suitable pressure to maintain the belt engaging surfaces of the belt in driving relation to pulleys of either the form disclosed by Figure 3 or Figure 4. However, due to the fact that the belt is provided with the ribs 39, a decreased fluid pressure may be maintained in the belt. In fact, in certain ordinary installations, in which the belt is not operated at an excessive tension, the fluid pressure within the belt may be made equal to atmospheric pressure. For under such conditions the ribs 39 will give the belt sufficient rigidity against lateral compression. As illustrated by Figure 8, the bottom section of the belt is provided with the continuous surface 47, thereby providing a ribbed belt which may be operated with both a flat faced and a V type pulley.

Figure 10:
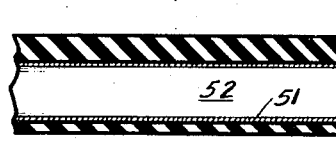
Figure 10 is a fragmentary sectional view, taken longitudinally of the belt of Figure 9 along the line 10—10.
Figure 9:
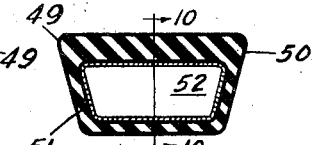
Figure 9 is a sectional view taken in a plane transverse to the length of the belt, of another modified form of the belt.

Figures 9 and 10 illustrate a form of the belt, which may be operated at high peripheral speeds, at which the belt tension is small in comparison to the power transmitted. In this form the top and bottom sections and the side walls of the belt 49 are formed by the rubber or rubber composition tube 50 having the cord section 51 formed on the inside thereof. As in the construction of Figures 1 and 8, the cord section 51 may be formed of cord material wound spirally along the length of the belt. In this form the cord section 51 carries substantially all of the tension produced in the side walls of the belt by the fluid pressure of the fluid enclosed within the cavity 52 in the belt. The fluid pressure within the cavity 52 may be maintained at the value required to give the belt adequate rigidity against lateral compression. Due to the uniform construction of the belt, there is no tendency for one part of the belt to separate from another part. Thus the belt may be bent over small pulley diameters and operated at high peripheral speeds without failure of the belt due to separation of the belt structure.

Figure 11:
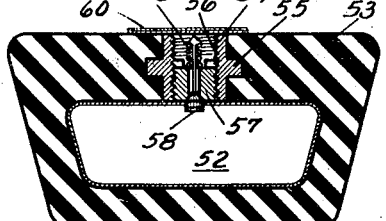
Figure 11 is an enlarged sectional view of the belt of Figure 9, illustrating a form of valve, which may be employed with each of the belts disclosed for sealing the inert fluid within the belt.

Figure 11 is an enlarged sectional view of the belt of Figure 9, illustrating a form of a valve mechanism, which may be employed with each of the belt forms disclosed for supplying the inert fluid into the interior of the belt. Referring to Figure 11, the top section 53 of the belt has the tubular metal plug 54 molded therein, which is provided with the thread 56 formed on the inside thereof and with a plurality of ears 55 on the outside thereof, which engage the belt material. The tubular valve seat 57 is screwed within the tubular plug 54 and engages the thread 56. The valve 58 is resiliently urged against the valve seat 57 by the spring 59. It is obvious from the construction that the valve 58 will be maintained closed as long as the fluid pressure within the belt cavity exceeds the fluid pressure exterior of the belt.

In order to insure against leakage, the rubber washer 60 may be vulcanized over the tubular plug 54, to hermetically seal the belt cavity 52. If during the life of the belt it is necessary to replenish the fluid within the belt cavity, the rubber washer 60 may be removed and, after the pressure within the cavity has been brought to the required value, may be replaced by another.

In order to obtain a large variation in effective pulley diameter, with a minimum width of belt, adjustable pulley structures are usually formed with an included angle between the opposite pulley faces considerably smaller than that commonly used in fixed diameter V belt drives. Thus in variable speed drives, employing one adjustable diameter pulley and one fixed diameter pulley, it is necessary to obtain a special fixed diameter pulley, in which the included angle between the opposite faces of the pulley is made equal to the included angle of the adjustable diameter pulley.

Figure 12:
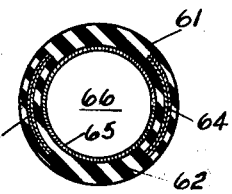
Figure 12 is a sectional view taken in a plane transverse to the length of the belt of another modified form of the belt.

Figure 12 illustrates a form of the belt which may be employed in adjustable speed drives, in which one of the pulleys is an adjustable diameter pulley, and in which the other pulley may be a flat faced pulley, a grooved pulley such as that used in rope drives, or a V belt pulley having an included angle other than that of adjustable diameter pulley. Referring to Figure 12, the belt 61 is formed of the rubber or rubber composition section 62, having the cord sections 63 and 64 molded therein, and the cord section 65 adjacent to the fluid cavity 66 within the belt. As in the other forms of the belt, the cord sections 63 and 64 are formed of cord material extending longitudinally of the belt, the cord section 65 is formed of cord materially wound spirally along the length of the belt, and the pressure of the inert fluid within the belt may be adjusted to the value required to give the belt adequate rigidity against lateral compression.

Figure 13:
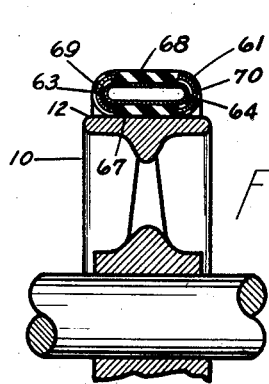
Figure 13 is a diagrammatic sectional view of the belt of Figure 12, shown in conjunction with a flat faced pulley.

Figure 13 illustrates the application of the belt to a flat faced pulley. As illustrated by the drawing, the belt is flattened out so that the inside wall 67 of the belt forms a substantially flat surface in driving relation to the crown 12 of the pulley. The top wall 68 of the belt is also flattened out to form a substantially flat surface, and the side walls 69 and 70, having the cord material imbedded therein, are bent to give the belt an oval shape. When the belt is bent around the pulley the top section 68 is stressed in tension, and the bottom section 67 is stressed in compression. However, the stresses produced within the belt, by the distortion of the tension and compression areas, are small, due to the fact that these parts of the belt are formed substantially entirely of rubber or rubber composition material having a high flexibility. The side walls 69 and 70 of the belt, having the cord material imbedded therein, suffer relatively little distortion and consequently are subject to only a small stress when the belt is bent around the pulley. As in the construction of Figure 3, it is obvious that a good grip is provided on the pulley by the lower section 67 of the belt, which is yieldingly urged into contact with the pulley surface.

Figure 14:
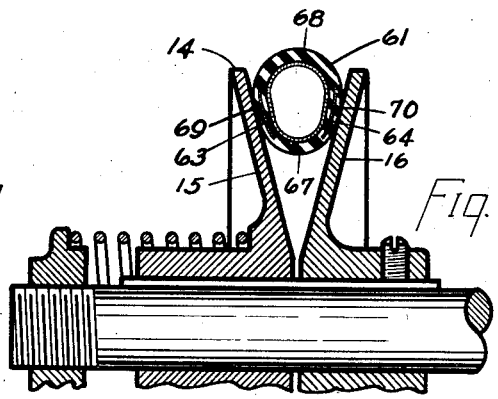
Figure 14 is a diagrammatic sectional view of the belt of Figure 12, shown in conjunction with a variable diameter pulley structure, having a pair of pulley sections with opposed inclined faces for engaging opposite sides of the belt.

Figure 14 illustrates the application of the belt to a V type or adjustable diameter pulley. In this application the side walls 69 and 70 of the belt engage the opposed inclined faces of the pulley sections 15 and 16, and the cord sections 63 and 64 are adjacent to the pulley engaging surfaces. The top and bottom sections 68 and 67 are bent to give the belt a substantial area in contact with the pulley faces. As in the construction of Figure 13, the maximum distortion, due to the bending of the belt, occurs in the top and bottom sections, which are formed of highly flexible rubber material, thereby reducing to a minimum the resultant stresses within the belt structure.

It is obvious from the illustration of Figure 14 that the belt 61 will assume the shape required by the internal pressure and by the included angle of the pulley faces. Thus one of the pulleys, over which the belt is operated, may have one included angle between the pulley faces, and the other of the pulleys may have a different included angle between the pulley faces; or one of the pulleys may be a V type pulley and the other pulley may be a flat faced pulley.

Figure 16:
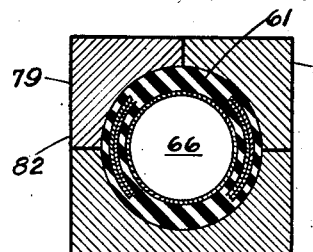
Figure 16 is a sectional view of the final mold used in making the belt of Figure 12.
Figure 15:
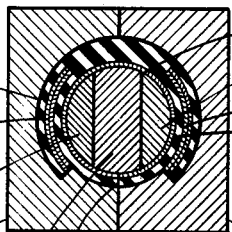
Figure 15 is a sectional view of the mold used in a preliminary step in making the belt of Figure 12.

Figures 15 and 16 illustrate the molds used in making the belt of Figure 12. Referring to Figure 15, the mold sections 71, 72 and 73 may be assembled to form an annular ring, over which the cord material 65 is spirally wound. To facilitate removal of the belt from the mold, the mold sections 71, 72 and 73 may be made in as many segments as is desired. The annular ring, with the cord section 65 wound thereon, may then be covered with a layer of rubber 74, over which the cord sections 63 and 64 may be applied. The annular mold sections 76 and 77, with the layer of rubber 75 applied thereto, may then be placed on either side of the belt structure supported by the annular ring, and urged toward each other until they come into contact. Heat may then be applied to cure the rubber. After the rubber has been cured, the mold sections 76 and 77 may be separated to free the belt, after which the mold sections 71, 72 and 73 may be removed from the interior of the belt by cutting the belt along the line 78, extending along the middle of the inside periphery.

The belt may be molded into its final form in the mold 82, Figure 16, formed by the mold sections 79, 80 and 81. The mold sections 79 and 80, which are in the form of the annular rings, may be brought together on either side of the belt to form the top part of the mold cavity. A sufficient quantity of rubber may then be applied to the inside periphery of the belt to fill the remaining mold cavity, after which the mold section 81, which may be suitably formed of several segments, is urged into contact with the sections 79 and 80 to complete the mold. Heat may then be applied to the mold to cure the rubber. During the curing process fluid pressure may be applied to the cavity 66 within the belt to maintain the side surfaces of the belt in engagement with the side walls of the mold cavity.

Figure 17:
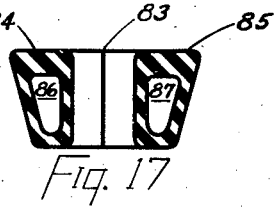
Figure 17 is a sectional view, taken in a direction transverse to the length of the belt, of another modified form of the belt.
Figure 18:
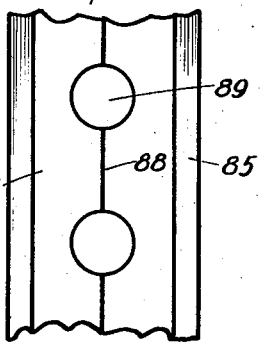
Figure 18 is a fragmentary longitudinal view of the belt of Figure 17 as viewed from the bottom of the belt.

Figures 17 to 22 illustrate forms of the belt which may be employed, where a belt of great width is required. The belt 83, Figure 17, is formed of the two tubular sections 84 and 85 having the fluid cavities 86 and 87 therein. As illustrated by Figure 18, sections 84 and 85 are joined together at the spaced apart places 88, forming the apertures 89, extending through the belt between the top and bottom faces. The apertures 89 permit the passage of ventilating air through the belt, thereby maintaining the belt at the lowest possible operating temperature. The belt may be formed entirely of rubber or rubber composition material, thereby ensuring a high degree of flexibility in bending around the pulley.

Figure 19:
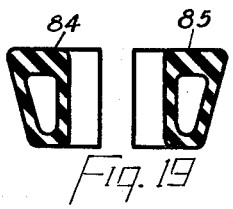
Figure 19 is a sectional view, taken in a direction transverse to the length of the belt, of the belt of Figure 17, illustrating the method of making the belt.
Figure 20:
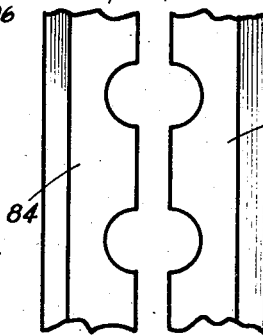
Figure 20 is a fragmentary longitudinal view, taken from the bottom of Figure 19.

As illustrated by Figures 19 and 20, the belt may be formed by forming the sections 84 and 85 separately, which may then be brought together, as illustrated by Figures 20 and 18, and vulcanized along the line 88 to form the unitary belt.

Figure 21:
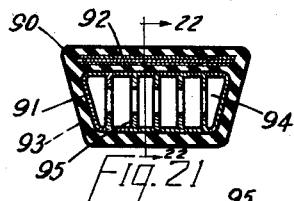
Figure 21 is a sectional view, taken in a direction transverse to the length of the belt, of another modified form of the belt.

Figure 21 illustrates a belt having a plurality of tension members therein for reinforcing the belt against the internal pressure produced by the enclosed fluid. Referring to Figure 21, the belt 90 is formed of the rubber or rubber composition section 93, having the cord sections 91 and 92 molded therein. As in the other forms, the cord section 91 is formed of cord material wound spirally along the length of the belt adjacent to the fluid cavity 94 and the cord section 92 is formed of cord material extending longitudinally of the belt. A plurality of tension members 95 are provided, within the fluid cavity 94, for joining the top and bottom sections of the belt.

Figure 22:
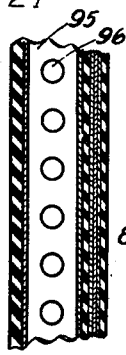
Figure 22 is a fragmentary longitudinal section of the belt of Figure 21, taken along the line 22—22.

As illustrated by Figure 22, the tension members 95 are provided with a plurality of apertures 96 to provide free passage of the fluid enclosed within the cavity 94, between the opposite sides of the tension members.

The tension members 95 provide means whereby an increased fluid pressure may be maintained within the belt. For it is obvious from the nature of the construction that a fluid pressure within the cavity 94 tends to distort the side walls of the belt to change the cross sectional form of the fluid cavity into a circle. However, the tension members, extending between the top and bottom sections of the belt, keep the top and bottom sections from separating from each other, thereby maintaining the shape of the belt.

The invention has been described in connection with a belt formed of rubber or rubber composition material. However, it is obvious that the invention can be applied to any belt, which may be formed of flexible material capable of maintaining a fluid pressure within the belt cavity.

I claim:

1. An edge active belt for the transmission of mechanical power, having a pair of longitudinally extending hollow members joined along a medial plane, said members having contiguous recesses forming apertures through the belt, and a fluid filling within the members, adapted to withstand lateral compression forces.

2. An edge active belt for the transmission of mechanical power, having a pair of longitudinally extending hollow members joined along a medial plane, said members having contiguous recesses forming apertures through the belt, said apertures being arranged from the top to the bottom of the belt, the wall of each hollow member being of insufficient thickness to withstand lateral compression forces transverse to the apertures, and that normally obtain in the use of the belt, and a fluid filling within the members, adapted to withstand said lateral compression forces.

THOMAS G. MYERS.